US008123159B2

(12) United States Patent
Hollimon et al.

(10) Patent No.: US 8,123,159 B2
(45) Date of Patent: *Feb. 28, 2012

(54) ENGINE EXHAUST SYSTEM

(75) Inventors: Charles Hollimon, North Richland Hills, TX (US); John Barber, Arlington, TX (US); John Herman Sherrer, Keller, TX (US); Robert Laramee, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 556 days.

This patent is subject to a terminal disclaimer.

(21) Appl. No.: 12/303,963

(22) PCT Filed: Jun. 11, 2007

(86) PCT No.: PCT/US2007/013679
§ 371 (c)(1),
(2), (4) Date: Dec. 9, 2008

(87) PCT Pub. No.: WO2008/097247
PCT Pub. Date: Aug. 14, 2008

(65) Prior Publication Data
US 2010/0229569 A1    Sep. 16, 2010

(51) Int. Cl.
*B64C 15/12* (2006.01)
(52) U.S. Cl. .................. 244/12.4; 244/23 D; 244/23 B; 239/265.23
(58) Field of Classification Search ................. 244/12.4, 244/12.5, 7 R, 23 D, 23 B; 239/265.17, 265.19, 239/265.23, 265.31, 265.35, 265.41; 138/108, 138/112–114
See application file for complete search history.

(56) References Cited

U.S. PATENT DOCUMENTS

| 2,846,844 | A | * | 8/1958 | O'Rourke | 239/127.3 |
| 2,961,198 | A | * | 11/1960 | Stevens | 244/12.5 |
| 3,266,245 | A | * | 8/1966 | Mullins | 60/226.1 |
| 3,743,185 | A | * | 7/1973 | FFowces-Williams et al. | 239/265.27 |
| 4,073,440 | A | * | 2/1978 | Hapke | 239/265.29 |
| 4,441,313 | A | * | 4/1984 | Joubert et al. | 60/262 |
| 4,474,345 | A | * | 10/1984 | Musgrove | 244/53 R |
| 6,752,591 | B2 | * | 6/2004 | Hain | 415/136 |
| 2005/0204742 | A1 | * | 9/2005 | Lair | 60/770 |

OTHER PUBLICATIONS

Chinese Office Action dated Mar. 18, 2010 from CN Application No. 200780021497.3.
CN Examination Report from CN counterpart Application No. 200780021497.3, issued by the Patent Office of China on May 25, 2011.

* cited by examiner

*Primary Examiner* — Timothy D Collins
*Assistant Examiner* — Jamie S Stehle
(74) *Attorney, Agent, or Firm* — James E. Walton; Richard G. Eldredge

(57) ABSTRACT

An exhaust system for an aircraft has a primary exhaust duct for communicating exhaust gas from an engine exhaust exit and is configured for movement with the engine. A secondary exhaust duct is in fluid communication with the primary exhaust duct and is movably mounted to the airframe. The system has means for maintaining a generally consistent relative alignment between the primary duct and the secondary duct.

7 Claims, 4 Drawing Sheets

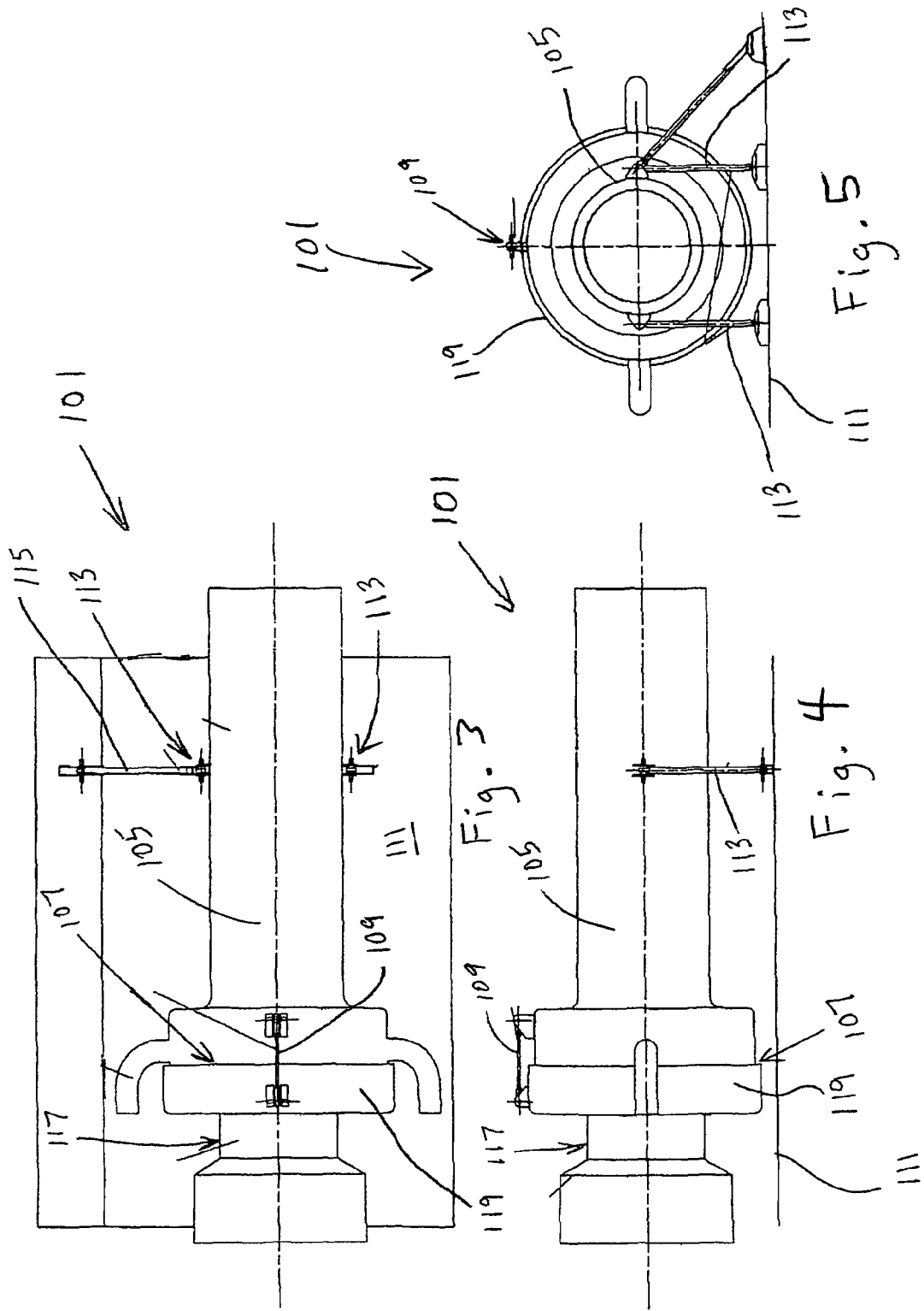

ENGINE EXHAUST SYSTEM

TECHNICAL FIELD

The technical field is engine exhaust systems.

DESCRIPTION OF THE PRIOR ART

In conventional aircraft exhaust systems, an exhaust ejector has a primary exhaust gas duct attached to an engine flange for receiving exhaust gas from the engine and passing exhaust gas through the primary exhaust gas duct. The conventional exhaust ejector also has a secondary engine exhaust gas duct attached to the airframe and initially concentric with the primary exhaust duct. However, shifting, vibrating, or other relative movement of the engine with respect to the airframe often results in the primary exhaust gas duct becoming non-concentric with the secondary exhaust gas duct.

For example, FIG. 1 shows a prior-art engine exhaust system comprising a primary exhaust duct 13, a secondary exhaust duct 15. Primary exhaust duct 13 is attached directly to engine 17 and moves with engine 17, whereas secondary exhaust duct 15 is attached to airframe 19 and remains in a generally fixed position relative to airframe 19. When engine 17 moves relative to airframe 19, primary duct 13 and secondary duct 15 may become non-coaxial and non-concentric. FIG. 1 illustrates this, as axis 21 of primary duct 13 is not coaxial with axis 23 of secondary duct 15.

When primary duct 13 is not concentric with secondary duct 15, the exhaust gas flow in secondary duct 15 may be directionally biased, resulting in poor ejector performance. The misalignment can cause several undesirable conditions, including turbulent exhaust gas flow within secondary duct 15 and/or direct impinging of portions of the flow of hot exhaust gas 25 on inner surface 27 of secondary duct 15. Both of these conditions can result in overheating of portions of secondary duct 15. In addition, less than optimal exhaust gas ejection may include higher engine compartment temperatures, higher exhaust gas temperatures, and these effects may negatively impact other components of the aircraft.

BRIEF DESCRIPTION OF THE DRAWINGS

FIG. 3 is a top view of the engine exhaust system of FIG. 1.

FIG. 4 is a side view of the engine exhaust system of FIG. 1.

FIG. 5 is an end view of the engine exhaust system of FIG. 1.

DESCRIPTION OF THE PREFERRED EMBODIMENT

To resolve the issue of aircraft exhaust ducts undesirably becoming non-concentric due to relative movement between the engine and the airframe of an aircraft, an engine exhaust system provides a means for linking the two ducts together so that even with engine movement relative to the airframe, the two ducts remain concentric. Therefore, if engine movement occurs for any reason, the airframe mounted secondary duct is pushed or pulled into consistent alignment with the primary duct, maintaining maximum ejector performance.

Figure 1:
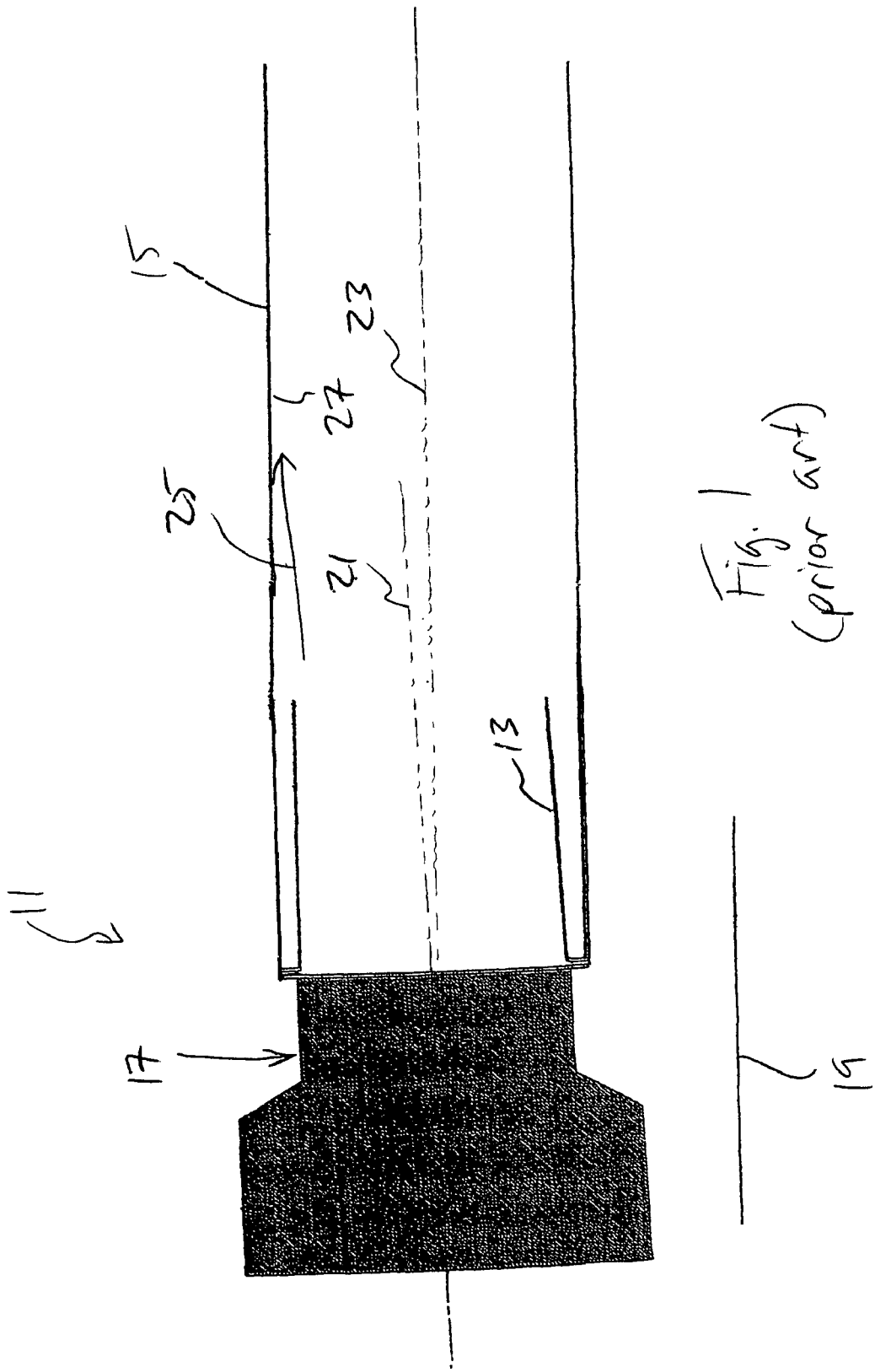
FIG. 1 is a cross-sectional side view of a prior-art engine exhaust system.
Figure 2:
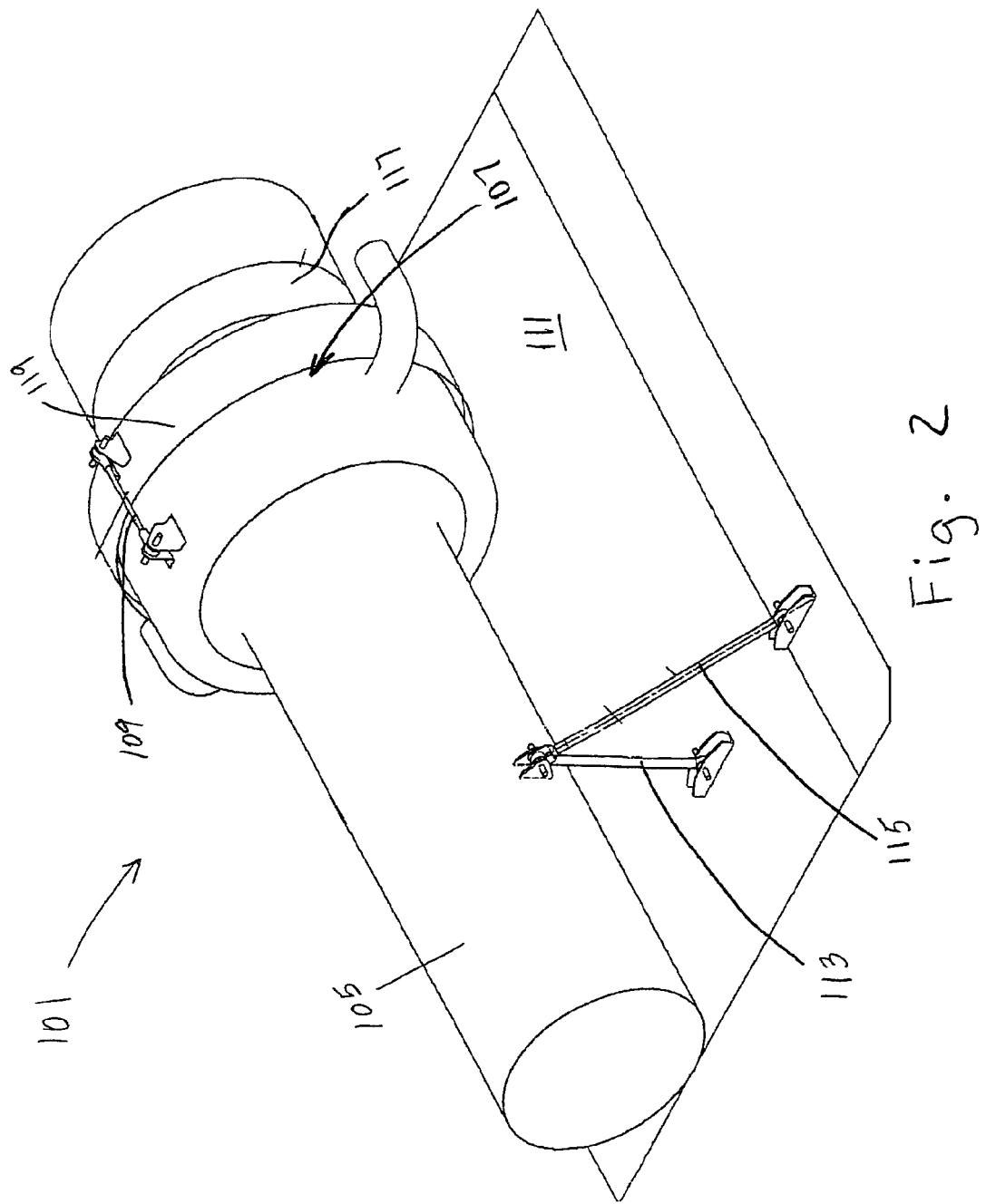
FIG. 2 is an oblique view of an embodiment of an engine exhaust system.
Figure 6:
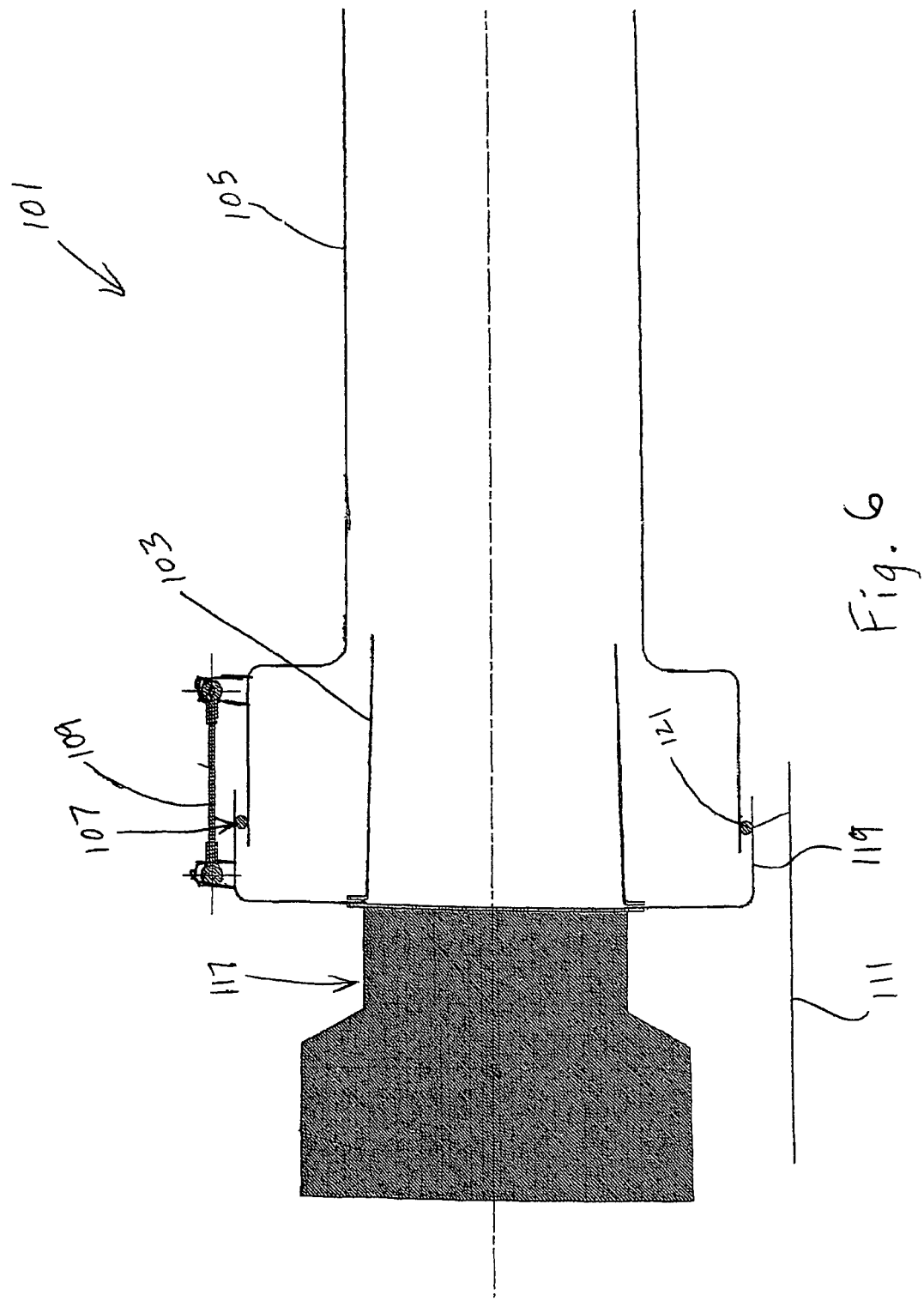
FIG. 6 is a cross-sectional side view of the engine exhaust system of FIG. 1.

Referring now to FIGS. 2 through 6 in the drawings, an embodiment of an engine exhaust system 101 is illustrated. Exhaust system 101 comprises a tubular primary exhaust duct 103 (only shown in FIG. 6), a tubular secondary exhaust duct 105, and a slip joint 107 for allowing relative axial movement between ducts 103, 105. Primary exhaust duct 103 and secondary exhaust duct 105 are also held in alignment by a drag link 109. Secondary exhaust duct 105 is connected to an airframe 111 and is supported by vertical struts 113 and a lateral strut 115, which are preferably struts connected at each end with uni-ball connectors. Vertical struts 113 carry vertical loads, and lateral strut 115 carries side loads. Preferably, the strut attachments are located on or very close to the center of gravity to avoid any undesired moments.

Primary exhaust duct 103 is attached directly to engine 117 for allowing exhaust gas to flow from engine 117 through primary exhaust duct 103 and into secondary duct 105. A forward end of secondary exhaust duct 105 is slipped concentrically into and sealably joined to an engine flange 119 through the use of o-ring type seal 121 in slip joint 107, and use of o-ring seal 121 allows for thermal expansion of ducts 103, 105. O-ring seal 107 is preferably a high-temperature o-ring type seal. Slip joint 107 also supports duct 105 in both vertical and horizontal directions, but not in an axial direction. Axial control of duct 105 is accomplished with drag link 109, which connects flange 119 to secondary duct 105. The mounts of drag link 109 are preferably uni-ball connectors, and this configuration allows for relative axial movement between engine 117 and secondary duct 105, but this does not allow for vertical or lateral movement. The single degree of freedom associated with drag link 109 allows engine movement to push or pull secondary exhaust duct 105 consistently with primary duct 103 and keeps the system in the desired alignment.

The exhaust system provides for several advantages, including: (1) the ability to maintain primary and secondary exhaust ducts in a desired orientation; (2) low weight; (3) increased reliability and durability; and (4) easy installation.

This description includes reference to illustrative embodiments, but it is not intended to be construed in a limiting sense. Various modifications and combinations of the illustrative embodiments, as well as other embodiments, will be apparent to persons skilled in the art upon reference to the description.

The invention claimed is:

1. An exhaust system for an aircraft having an airframe and an engine with an exhaust exit, the exhaust system comprising:
   a primary exhaust duct adapted to communicate exhaust gas from the engine exhaust exit and configured for movement with the engine;
   a secondary exhaust duct in communication with the primary exhaust duct and adapted to be movably mounted to the airframe;
   a drag link connecting the secondary duct to the primary duct, the drag link being configured to maintain coaxial alignment between the primary duct and the secondary duct and to allow axial movement of the secondary duct relative to the primary duct; and
   a slip joint positioned between the primary duct and the secondary duct, the slip joint being configured to allow axial movement of the secondary duct relative to the primary duct and configured to prevent vertical and lateral movement of the secondary duct relative to the primary duct.

2. The exhaust system according to claim 1, further comprising:

at least one strut adapted to connect the secondary duct to an airframe.

3. An aircraft engine system, comprising:

an engine having an exhaust exit;

a primary exhaust duct in fluid communication with the exhaust exit and configured for movement with the engine;

a secondary exhaust duct in fluid communication with the primary exhaust duct and adapted to be movably mounted to the airframe;

a drag link connecting the secondary duct to the primary duct, the drag link being configured to maintain coaxial alignment between the primary duct and the secondary duct and to allow axial movement of the secondary duct relative to the primary duct; and a slip joint positioned between the primary duct and the secondary duct, the slip joint being configured to allow axial movement of the secondary duct relative to the primary duct and configured to prevent vertical and lateral movement of the secondary duct relative to the primary duct.

4. The engine system according to claim 3, further comprising:

at least one strut adapted to connect the secondary duct to an airframe.

5. An aircraft, comprising:

an airframe;

an engine having an exhaust exit;

a primary exhaust duct in fluid communication with the exhaust exit and configured for movement with the engine;

a secondary exhaust duct in fluid communication with the primary exhaust duct and movably mounted to the airframe;

a drag link connecting the secondary duct to the primary duct, the drag link being configured to maintain coaxial alignment between the primary duct and the secondary duct and to allow axial movement of the secondary duct relative to the primary duct; and a slip joint positioned between the primary duct and the secondary duct, the slip joint being configured to allow axial movement of the secondary duct relative to the primary duct and configured to prevent vertical and lateral movement of the secondary duct relative to the primary duct.

6. The aircraft according to claim 5, further comprising:

at least one strut adapted to connect the secondary duct to an airframe.

7. An aircraft, comprising:

an airframe;

an engine having an exhaust exit;

a primary exhaust duct in fluid communication with the exhaust exit and configured for movement with the engine;

a secondary exhaust duct in fluid communication with the primary exhaust duct and movably mounted to the airframe;

a drag link connecting the secondary duct to the primary duct, the drag link being configured to maintain coaxial alignment between the primary duct and the secondary duct and to allow axial movement of the secondary duct relative to the primary duct;

a slip joint positioned between the primary duct and the secondary duct, the slip joint being configured to allow axial movement of the secondary duct relative to the primary duct and configured to prevent vertical and lateral movement of the secondary duct relative to the primary duct; and at least one strut connecting the secondary duct to the airframe;

wherein the drag link and at least one strut cooperate to maintain a generally consistent relative alignment between the primary duct and the secondary duct.

* * * * *

UNITED STATES PATENT AND TRADEMARK OFFICE
CERTIFICATE OF CORRECTION

Page 1 of 1

PATENT NO. : 8,123,159 B2
APPLICATION NO. : 12/303963
DATED : February 28, 2012
INVENTOR(S) : Charles Hollimon et al.

It is certified that error appears in the above-identified patent and that said Letters Patent is hereby corrected as shown below:

On the Title Page, the following priority information should read:

Item (60) Related U.S. Application Data

Provisional application No. 60/812,391, filed on Jun. 9, 2006

Signed and Sealed this
Twenty-second Day of May, 2012

David J. Kappos
*Director of the United States Patent and Trademark Office*